UNITED STATES PATENT OFFICE.

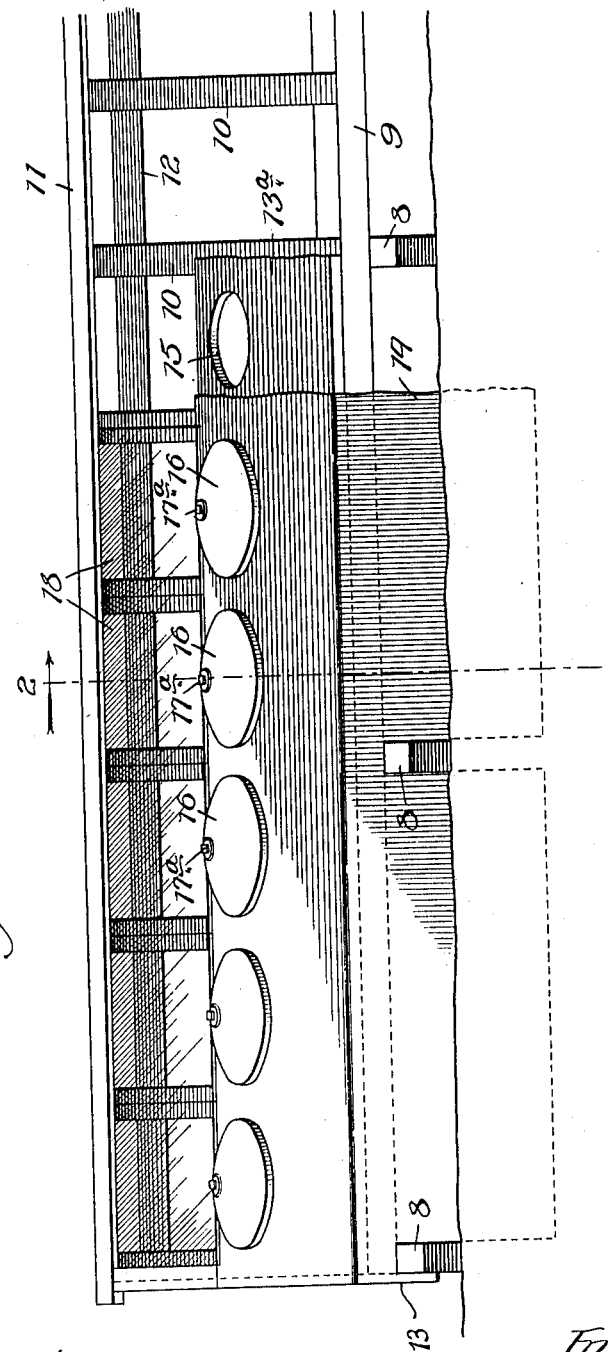

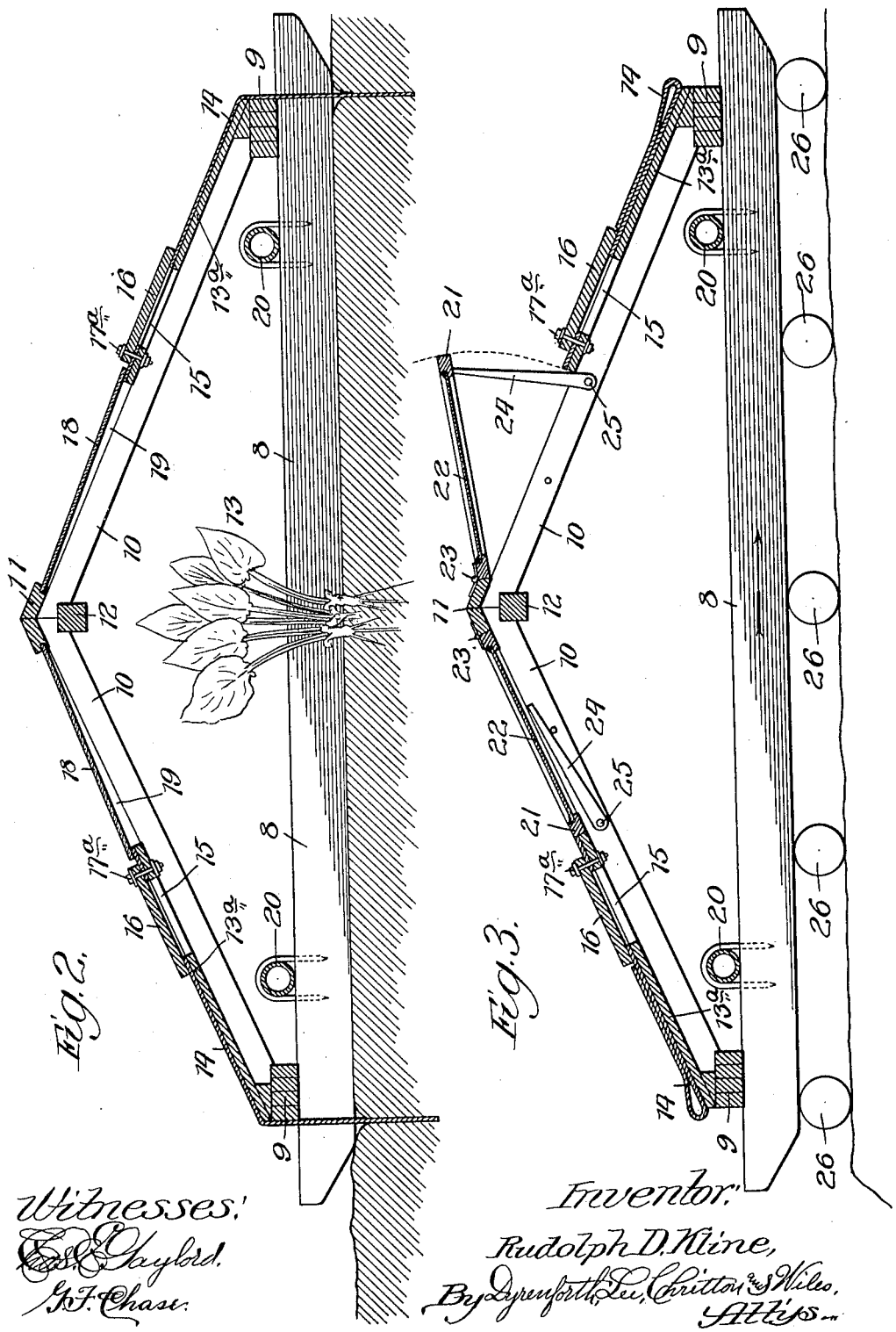

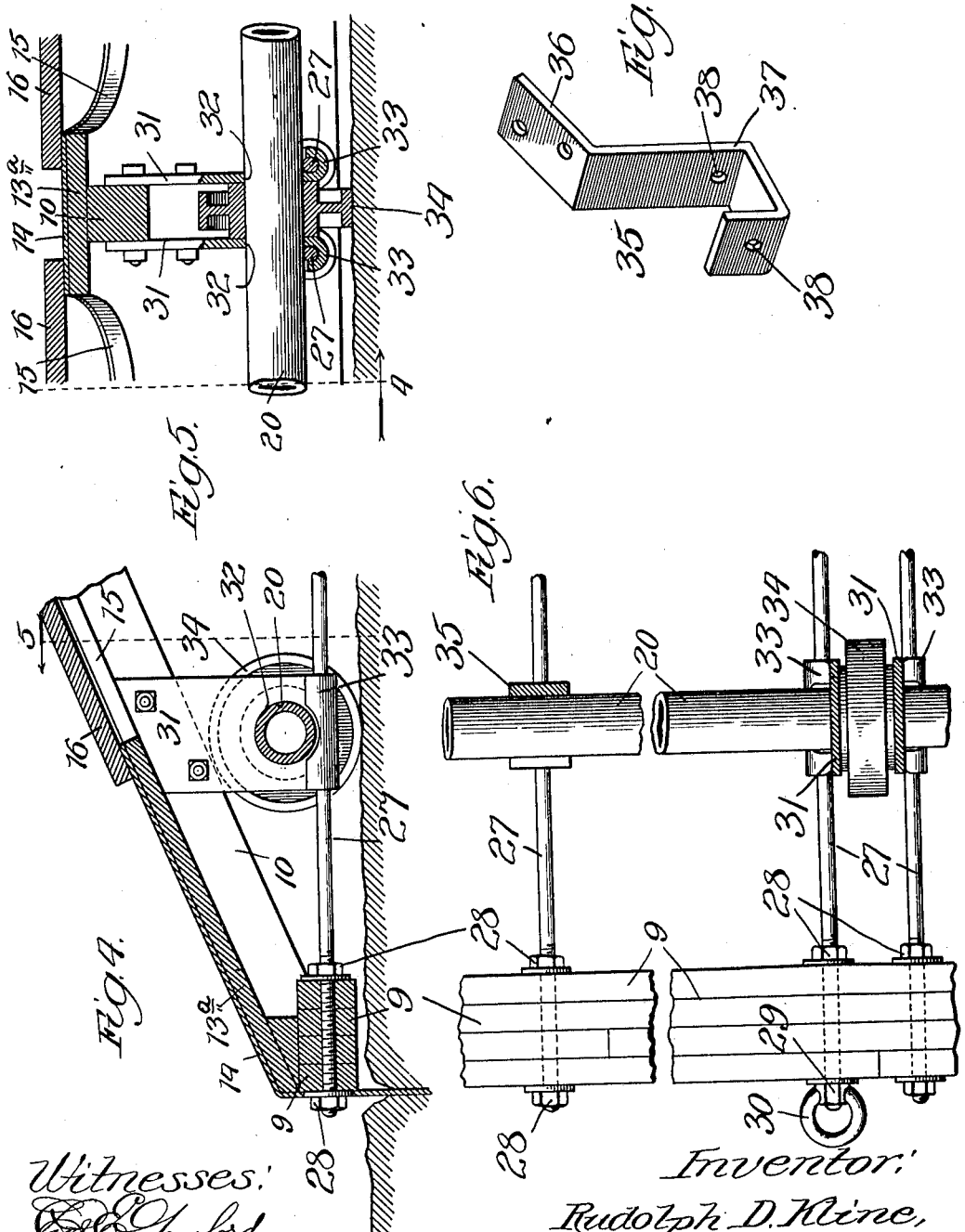

RUDOLPH D. KLINE, OF STREATOR, ILLINOIS.

GREENHOUSE.

1,035,605.  Specification of Letters Patent.  Patented Aug. 13, 1912.

Application filed May 16, 1910. Serial No. 561,581.

*To all whom it may concern:*

Be it known that I, RUDOLPH D. KLINE, a citizen of the United States, residing at Streator, in the county of Lasalle and State of Illinois, have invented a new and useful Improvement in Greenhouses, of which the following is a specification.

My object, generally stated, is to provide improvements in greenhouses to the end of enabling them to be manufactured and heated at relatively low cost.

One of the features of my invention consists in forming the greenhouse of such proportions as to permit the attendant to reach through removable closures in its roof, and harvest, or otherwise attend to, the plants protected thereby, thus avoiding the necessity of constructing the greenhouses of such proportions as will permit the attendant to walk therethrough, with consequent loss of ground-space necessary for paths, loss of heat by escape through the door-openings at the sides of the house and by reason of the height of the roof above the ground, and relative high cost of construction.

Another feature of my invention consists in providing means for conserving the heat supply to the greenhouse for obtaining the maximum efficiency thereof and permitting economical operation of the greenhouse, and still other features are to provide means for maintaining the pipes for conducting the heating fluid in fixed position in the house to prevent their displacement when the house is moved; means coöperating with the cross-members of the house for bracing the roof; and simple means for enabling the house to be easily and readily moved.

I have devised my improvement for use more especially in connection with what are known as portable greenhouses constructed to be moved from place to place to be positioned over any of the rows of plants to force their growth, though it will be understood that I do not wish to limit my invention to its embodiment in portable constructions.

Referring to the accompanying drawings—Figure 1 is a view in side elevation of one end of a greenhouse constructed in accordance with my invention, certain portions thereof being broken away to better disclose details thereof. Fig. 2 is a section taken at the line 2 on Fig. 1 and viewed in the direction of the arrow. Fig. 3, a cross-sectional view of a greenhouse constituting another embodiment of my invention, the house in this instance being shown as supported on rollers for facilitating its removal from one location to another. Fig. 4 is a sectional view of a portion of one side of a greenhouse constructed in accordance with another embodiment of my invention. Fig. 5 is a section taken at the line 5 on Fig. 4 and viewed in the direction of the arrow. Fig. 6 is a broken plan view of the construction illustrated in Fig. 4; and Fig. 7, a perspective view of another form of pipe-supporting bracket.

Referring particularly to Figs. 1 and 2, the greenhouse therein shown is formed of an under-structure of beams 8 resting on the ground and arranged in parallel spaced relation to extend transversely of the structure, hereinafter described, supported thereon. Secured to these beams toward their ends are girders 9 which extend the full length of the house, and rising from these girders are upwardly and inwardly extending inclined rafters 10, which meet at their upper ends and are secured in such position by a ridge-pole 11 superposing them and a stringer 12 to which the rafters are mortised, the parts thus described forming the skeleton frame-work of the structure.

The ends of the house are provided with end walls 13 and superposed on the rafters 10 at both sides of the house, to extend the full length thereof, and approximately half way up to the ridge-pole 11, though this proportion may be varied, is a roof-section 13$^a$, shown as formed of boards extending longitudinally of the house, though any other suitable material may be used. The upper surfaces of the roof-sections 13$^a$ are covered with sheets of building-paper 14, the lower edges of which are free and extend below the lower edges of the sections 13 at both sides of the house, the free edge-portions of these sheets being adapted to be embedded in the earth below the greenhouse as represented in Fig. 2 for a purpose hereinafter explained. The sections 13$^a$ of the roof contain at each side of the house, a series of round openings 15 which are arranged at intervals as illustrated in Fig. 1, each opening being provided with a swinging door, or cover, 16 pivoted, as indicated at 17$^a$, to the sections 13$^a$, these covers forming removable closures for the openings 15. The upper portions of the roof of the house at the opposite sides of the ridge-pole 11, are formed of glass, the plates of which are represented at 18 as resting at their lateral abutting edges upon the upper surfaces of cleats 19 secured to the rafters 10, the lower edges of these glass plates overlapping the upper marginal edges of the adjacent sections 13ª, as clearly represented in Fig. 2.

Any suitable means for heating the greenhouse may be employed, as for instance a hot water system, the pipes of which are represented at 20 as stapled to and resting on the beams 8 in close proximity to the ground. When the plants in the greenhouse require attention, access thereto may be readily had by the attendant, who swings the covers 16 to open position and reaches through the openings 15 thus exposed, and when necessary bears his weight with his other arm against the sections 13ª, which are built sufficiently strong to sustain it.

The construction illustrated in Fig. 3 is the same as that illustrated in the preceding figures, excepting that the glass portion of the roof of the house instead of being permanent, is rendered movable in sections by filling in the space between the ridge-pole 11 and the upper edges of the sections 13ª with sashes 21 placed side by side and resting directly on the rafters 10, the cleats 19 in this construction being omitted. The sashes 21 are fitted with plates 22 of glass and are hinged at their upper edges, as indicated at 23, to permit them to be raised by the attendant, swinging arms 24 pivoted to the rafters 10, as indicated at 25, being provided for holding the sashes 21 in raised position when desired. Access to the plants covered by the greenhouse may be obtained from the outside thereof by reaching through the openings in the roof afforded when the sashes 21 are lifted, or through the openings 15.

As one of the main features of my invention consists in providing removable closures in the roof of the greenhouse for permitting access to the plants from the outside thereof, it will be understood that the openings 15 in the construction illustrated in Fig. 3 may be omitted, and, furthermore, that instead of providing the removable closures as described of the constructions illustrated in the drawings, any other suitable arrangement of removable closures for the purpose stated may be provided.

As before stated, I prefer to incorporate my improvements in portable houses which may be moved from one location to another, as desired, for subjecting any row of plants to the forcing operation. Thus, in Fig. 3, I have shown the construction therein illustrated as resting upon rollers 26 which may be inserted under the beams 8 for permitting the ready shifting of the building which, in practice, would usually be moved through a path extending cross-wise of the length of the building.

The free portions of the sheets 14 when embedded in the ground as illustrated in Fig. 2 separate the ground immediately below the greenhouse from the ground beyond, and as the sheets 14 are insulators they serve to confine the heat in the ground immediately below the greenhouse instead of permitting it to be dissipated into the ground beyond, this being an important feature in greenhouse constructions, as the heating of the ground immediately below it, rather than the air therein, is the primary consideration in operating a greenhouse. When a greenhouse is to be moved to a new location, the free edges of the sheets 14 should be removed from the ground and folded back to the position illustrated in Fig. 3. After reaching the new location, the free edges of the sheets 14 should then be embedded in the ground in the position illustrated in Fig. 2.

While the provision of the sheets 14 of paper for forming the insulating means is desirable, I do not wish to be understood as intending to limit my invention to the employment of such means for obtaining the result accomplished, as any other suitable means embedded in the earth and serving to separate the ground below the house from the ground beyond for confining the heat where it may be utilized to the best advantage, may be provided.

The construction illustrated in Figs. 4, 5 and 6 is the same as that shown in Fig. 1, excepting that the cross-beams of the structure are in the form of metal bars 27, instead of wooden beams, which extend through the sills 9 at opposite sides of the house and are maintained in position for bracing the structure by nuts 28 and 29, the nuts 29 being provided with eyes 30. In this construction, the pipes 20 are held in position by brackets 31 depending from the rafters 10 as represented in Fig. 5, the lower ends of these brackets containing openings 32 through which the pipes 20 extend and being curled upwardly around the adjacent bars 27, as represented at 33. Journaled on the pipes 20 between the members of the pairs of brackets 31 are wheels 34 upon which the house may be moved as desired. If desired, the brackets 31 may be used in connection with brackets of the form shown in Fig. 7. These brackets represented at 35 are formed with deflected upper-end portions 36 adapted to be bolted to the under sides of the rafters and depending trough-shaped portions 37, through holes 38 in the walls of which the bars 27 extend, the pipes 20 resting on the bars and being held against displacement by being confined between sections of the brackets 35. While both types of brackets are illustrated in the drawings as employed in the same house, it will be manifest that brackets of either form may be used alone.

The brackets 31 and 32 not only serve to hold the pipes in the proper position in the house and prevent them from becoming displaced when the house is moved, but operate to firmly brace the rafters and thus strengthen the structure against strains, such as those to which it would be subjected in moving it; and the eyes 30 disposed at intervals along the opposite sides of the house afford points of attachment for ropes or cables (not shown) by which the houses may be moved into new locations.

The feature of providing openings in the roof of a house with removable closures, which openings are of such size as to be substantially closed by the arm of the attendant when extended therethrough, is of importance in a house of this character, which is used in the open field and in the winter months where it is subjected to very cold weather, as the openings need be uncovered but for a moment, namely, while the attendant is introducing his arm into or withdrawing it from the house, and thus the escape of the hot air from the house and the entry therein of cold air is to all practical purposes prevented. By this arrangement the house may be made with a very low proof, thereby requiring much less heat to keep the house in properly heated condition, due to the reduced area of glass-roof and preventive of escape of hot air therefrom and entry of cold air, as compared with forcing houses as hitherto constructed wherein the attendant, to attend to the plants enters the door in a wall thereof and the houses are sufficiently high to permit the attendant to walk therethrough. Furthermore, the house may be kept at uniform high temperature, as the attendant does not enter it and thus shutting off or reducing the heat is rendered unnecessary. Again in the forcing of plants, as for example, rhubarb and asparagus, where the plants are forced out of season and after the stage of hibernation commences, it is necessary that the heat to which they are subjected after forcing growth commences, be maintained at a relatively high temperature, and if the temperature in the house covering the plants falls below such points, as is understood by those skilled in the art, the plants which are stimulated into growth artificially and in opposition to a natural tendency to resume the state of hibernation, or sleep, will lapse into sleeping condition. Plants which lapse into sleeping condition by being chilled as stated, after forced growth commences, cannot by the renewed application of heat thereto, at any degree, be forced into growth sufficiently to yield as good a product as they would have yielded had they not been chilled, and if the drop in temperature of the air in the house is excessive, the plants cannot be aroused and all effort to force them is useless. Furthermore after a plant is once chilled sufficiently to cause it to resume sleeping condition, a higher temperature than that necessary to force the plant when its growth is not so interrupted is required, to again start the plant into growth.

It will be manifest that by constructing a forcing house in accordance with my invention, there is no necessity for reducing the temperature therein, because the attendant in attending the plants does not enter the house, but operates through the openings in the house, and the escape of hot air from the house and the access of cold air thereto being prevented, a uniform temperature may be maintained in the house with the advantages above stated. Furthermore, while my improved forcing house presents the advantages above stated, its cost of construction and operation is reduced to the minimum.

What I claim as new, and desire to secure by Letters Patent, is—

1. A plant-forcing house having a comparatively low roof containing openings of substantially the same size as the attendant's arm, removable closures for said openings, and means for supplying heat to the interior of the house, the whole being constructed and arranged to permit the attendant on the outside of the house to reach through the said openings therein and attend to the plants covered by the house substantially without the entrance of cold air into, or the escape of hot air from, the house.

2. A plant-forcing house having its roof inclining downwardly at its opposite sides and containing openings at opposite sides of substantially the same size as the attendant's arm, removable closures for said openings, and means for supplying heat to the interior of the house, the whole being constructed and arranged to permit the attendant on the outside of the house to reach through the said openings therein to substantially the center line of the house and attend to the plants covered by the house substantially without the entrance of cold air into, or the escape of hot air from, the house.

3. A plant-forcing house having a comparatively low roof, the upper portion of which is formed of glass and the lower portion of material capable of resisting force exerted by the attendant in leaning against it, said lower portion of the roof containing openings substantially the same size as the attendant's arm, removable closures for said openings, and means for supplying heat to the interior of the house, the whole being constructed and arranged to permit the attendant on the outside of the house to reach through the said openings therein and attend to the plants covered by the house substantially without the entrance of cold air into, or the escape of hot air from, the house.

4. In combination with a greenhouse, flexible sheets secured to the greenhouse and embedded in the ground at its opposite sides for preventing the heat in the ground below the greenhouse from spreading to the ground beyond.

5. A greenhouse formed of a roof-section, a plurality of spaced cross-beams positioned below said roof-section and operating to prevent collapsing of the latter, braces connected with said roof and with the cross-members, and fluid-conducting pipes in the house engaging with said braces, for the purpose set forth.

6. A greenhouse formed of a roof-section, a plurality of spaced cross-members disposed below said roof-section and operating to prevent collapsing of the latter, braces connected with said roof and embracing said cross-members, and fluid-conducting pipes in the house engaging with said braces, for the purpose set forth.

7. A greenhouse containing fluid-conducting pipes, and wheels journaled on said pipes at which the house is supported on the ground.

8. A greenhouse formed of a plurality of spaced cross-members, a roof supported thereon, braces for the roof connected with said cross-members, fluid-conducting pipes supported on said braces, and wheels journaled on said pipes and confined thereon between said braces.

9. A greenhouse formed of a plurality of spaced cross-members, a roof supported thereon, braces for the roof arranged in pairs and connected with said cross-members, pipes extending through said braces, and wheels journaled on said pipes between numbers of pairs of said braces, for the purpose set forth.

10. A greenhouse formed of a roof-section and threaded cross-bars connected with the roof and provided with nuts formed with eyes disposed along a side of the house, for the purpose set forth.

RUDOLPH D. KLINE.

In presence of—
R. A. SCHAEFER,
JOHN WILSON.

---

Copies of this patent may be obtained for five cents each, by addressing the "Commissioner of Patents, Washington, D. C."